United States Patent [19]
Barnard et al.

[11] Patent Number: 5,776,341
[45] Date of Patent: Jul. 7, 1998

[54] FUEL INTAKE DEVICE FOR FUEL SYSTEMS

[75] Inventors: Richard S. Barnard, Monroe; Scott A. Chasen, Orange, both of Conn.

[73] Assignee: Sikorsky Aircraft Corporation, Stratford, Conn.

[21] Appl. No.: 772,679

[22] Filed: Dec. 23, 1996

[51] Int. Cl.$^6$ ..................................... B01D 35/02
[52] U.S. Cl. .................. 210/306; 210/316; 210/462; 210/456; 210/498; 210/499
[58] Field of Search .................. 210/172, 316, 210/459–462, 416.4, 456, 130, 305, 306, 317, 323.2, 498, 499, 457, 458, 497.01

[56] References Cited

U.S. PATENT DOCUMENTS 1,977,464  10/1934  White .................................. 210/460
3,291,184  12/1966  Varvel ................................. 210/172

Primary Examiner—Matthew O. Savage
Attorney, Agent, or Firm—Brian A. Collins

[57] ABSTRACT

A fuel intake device (20) for a fuel system (10) having a fuel tank (14) for containing a supply of fuel (16) and an internal fuel feed line (18) which is disposed internally of the fuel tank (14) and which extends into a sump region (26) thereof. The fuel intake device (20) is characterized by a filter assembly (40) which envelopes an end portion ($18_E$) of the internal fuel feed line (18) and which includes a lower fuel filtering portion (42) and an upper fuel bypass portion (44). The lower fuel filtering portion (42) has a plurality of fine apertures ($42_O$) therein for facilitating a primary flow ($P_F$) of fuel (16) therethrough and for filtering debris from the supply of fuel (16) in a normal operating mode. The upper fuel bypass portion (44) has a plurality of coarse apertures ($44_O$) for facilitating a secondary flow ($S_F$) of fuel therethrough in a bypass operating mode. Furthermore, the filter assembly (40) is situated about the end portion ($18_E$) such that the inlet orifice ($18_O$) thereof is disposed internally of the lower fuel filtering portion (42) and such that the coarse apertures ($44_O$) of the upper bypass portion (44) are distally spaced from the inlet orifice ($18_O$). The fuel intake device is further characterized by a shroud member (50) disposed about the filter assembly (40), which shroud member (50) includes an upper end portion (52) disposed in sealed combination with an external peripheral surface ($18_P$) of the internal fuel feed line (18) and a lower end portion (54) which extends into the sump region (26) of the fuel tank (14). The lower end portion (54), furthermore, defines an opening for facilitating fuel flow to the filter assembly (40).

8 Claims, 6 Drawing Sheets

FUEL INTAKE DEVICE FOR FUEL SYSTEMS

TECHNICAL FIELD

This invention is directed to fuel systems, and, more particularly, to a fuel intake device therefor which is operative to provide uninterrupted fuel flow in the presence of free ice in the fuel supply or in operating conditions which may accrete ice in the fuel system or on components thereof.

BACKGROUND OF THE INVENTION

Depending upon the operational environment of a particular fuel system, certain requirements are imposed on the design thereof for ensuring, inter alia, that fuel is supplied continuously and at a predetermined rate, particulate matter such as ice or debris in the fuel supply is filtered prior to ingestion by the engine, and the spillage of fuel is minimized in an emergency situation. For example, it will be appreciated that fuel systems for aircraft must ensure continuous operation of the fuel system in icing conditions and in the presence of debris in the fuel system. Furthermore, such fuel systems must provide means for mitigating the hazards of fuel spillage in the event of a fuel line rupture, i.e., in a crash or as a result of a ballistic impact.

More specifically, with respect to ice in the fuel supply/supply lines, the Federal Aviation Administration requires (FAA) that aircraft fuel systems operate in the presence of free water in the fuel supply which, at sub-freezing temperatures, can precipitate out of the fuel and form ice on system components, e.g., inlets, pumps, etc. As such, ice accretion can restrict fuel flow and result in engine "flame-out". Conventionally, this requirement has been addressed by the use of fuel additives, such as ethylene glycol monomethyl ether (also known as Prist® fuel additive produced by PPG Industries, Chemicals Group, located in Pittsburgh Pa.), to abate the formation of ice on system components. While such additives are effective for their intended purpose, the toxicity of such additives is increasingly raising concerns regarding safety, i.e., it has been reported that long-term exposure to such additives may cause health hazards.

With respect to debris or foreign objects which may enter the fuel supply, the FAA also requires that debris be filtered so as to avoid blockage of fuel supply lines or engine flow paths. One prior art system for satisfying this requirement employs filtering apparatus, i.e., screens or strainers, situated downstream of a boost pump disposed internally of the fuel tank. This system, which is a pressurized fuel system, provides a primary flow path through the filter apparatus and a secondary flow path which circumvents the filter apparatus in the event that fuel flow therethrough becomes restricted. More specifically, the secondary flow path includes spring-loaded check valves which open in response to a threshold level of back pressure in the fuel system, thereby facilitating a bypass flow of fuel to the engine.

Disadvantages of pressurized fuel systems relate to the weight and complexity associated with the internal boost pump, e.g., the need to route electrical power into the fuel tank, and the additional weight of bypass fuel lines and check valves. Another disadvantage of pressurized fuel systems relates to the increased potential for fuel discharge in the event of a fuel line rupture. The shortcomings of pressure fuel systems in this regard are discussed below.

With respect to requirements to minimize the discharge of fuel should a crash or other event fracture the fuel line, it is common practice to employ self-sealing break-away valves at various locations in the fuel system. These valves are designed to fracture or break before the failure of other components in the fuel system and immediately seal upon fracture to minimize fuel spillage. Despite this safety feature, ballistic damage or the dynamics of a crash may fracture or sever the fuel line without activating the break-away valves. In such event, pressure fuel systems can continue to pump fuel out of the fuel tank and produce or further aggravate a hazardous condition.

To further enhance system safety, alternative fuel systems have been developed which utilize suction pumps, i.e., rather than boost pumps, to deliver fuel to the engine. The suction pumps are engine driven and disposed externally of the fuel tank. As such, in the event of a fuel line rupture, air is drawn into the fuel system, thereby producing a benign failure mode. While suction fuel systems provide significant advantages in this regard, such systems are highly sensitive to pressure drops in the fuel system. That is, insofar as the maximum pressure differential produced therein is limited by several factors including, the lift and vapor handling capability of the suction pumps, suction fuel systems cannot employ components which produce large pressure drops. For example, suction fuel systems cannot utilize pressure actuated check valves, typically used in pressure systems, to circumvent flow around a filtering apparatus. Furthermore, the prior art suction fuel systems cannot tolerate large pressure drops due to an accumulation of ice on fuel system components. Accordingly, such prior art systems must resort to the use of anti-icing additives and the inherent disadvantages associated therewith.

SUMMARY OF THE INVENTION

It is an object of the present invention to provide a fuel intake device for fuel systems, which fuel intake device is operative to provide uninterrupted fuel flow in the presence of free ice in the fuel supply or in operating conditions which may accrete ice in the fuel system or on components thereof.

It is yet another object of the present invention to eliminate the requirement for anti-icing additives in the fuel supply of such fuel systems.

It is another object of the present invention to provide such a fuel intake device which filters debris from the fuel supply.

It is still another object of the present invention to provide such a fuel intake device which minimizes pressure drops and ice accretion.

It is yet another object of the present invention to provide such a fuel intake device which is of minimum mechanical complexity.

It is yet another object of the present invention to provide such a fuel intake device which maximizes the useable supply of fuel.

These and other objects are achieved by a fuel intake device for a fuel system having a fuel tank for containing a supply of fuel and an internal fuel feed line which is disposed internally of the fuel tank and which extends into a sump region thereof. The fuel intake device is characterized by a filter assembly which envelopes an end portion of the internal fuel feed line and which includes a lower fuel filtering portion and an upper fuel bypass portion. The lower fuel filtering portion has a plurality of fine apertures therein for facilitating a primary flow of fuel therethrough and for filtering debris from the supply of fuel in a normal operating mode. The upper fuel bypass portion has a plurality of coarse apertures for facilitating a secondary flow of fuel therethrough in a bypass operating mode. Furthermore, the filter assembly is situated about the end portion such that the inlet orifice thereof is disposed internally of the lower fuel filtering portion and such that the coarse apertures of the upper bypass portion are distally spaced from the inlet orifice.

The fuel intake device is further characterized by a shroud member disposed about the filter assembly, which shroud member includes an upper end portion disposed in sealed combination with an external peripheral surface of the internal fuel feed line, and a lower end portion which extends into the sump region of the fuel tank. The lower end portion, furthermore, defines an opening for facilitating fuel flow to the filter assembly.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIGS. 3a and 3b are an enlarged views of the filter assembly, wherein FIG. 3a depicts fine apertures of a lower fuel filtering portion of the filter assembly, and wherein FIG. 3b depicts coarse apertures of an upper fuel bypass portion of the filter assembly;

BEST MODE FOR CARRYING OUT THE INVENTION

Figure 1:
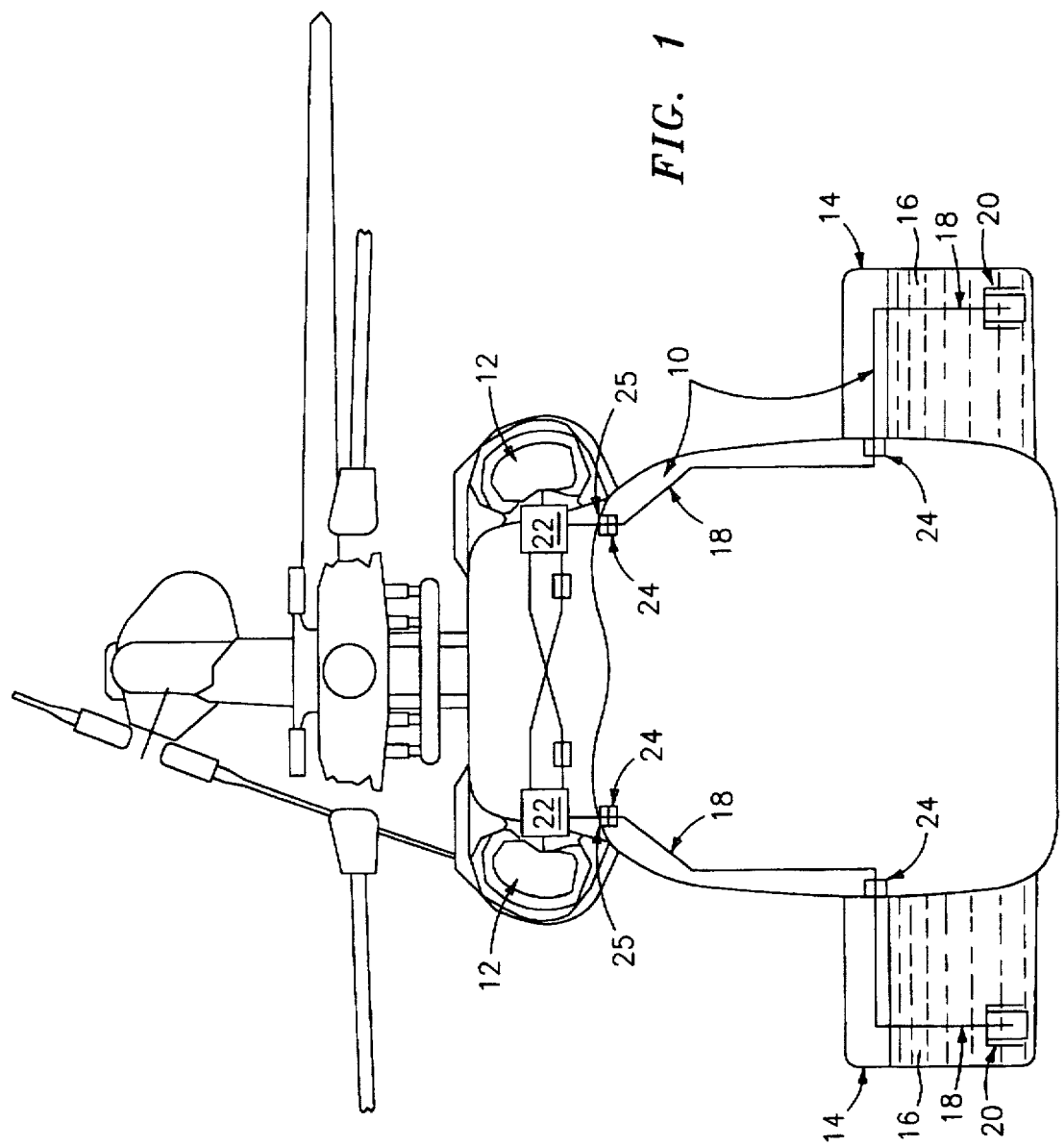
FIG. 1 is a schematic view of a helicopter fuel system employing a fuel intake device according to the present invention.

Referring now to the drawings wherein like reference characters identify corresponding or similar elements throughout the several views, FIG. 1 shows a simplified schematic view of a fuel system 10 for a helicopter including multiple gas turbine engines 12, fuel containing tanks 14 for storing a supply of fuel 16, fuel feed lines 18 extending from each fuel tank 14 and cross-feeding the gas turbine engines 12, and a fuel intake device 20 according to the present invention disposed internally of each fuel tank 14 for drawing fuel 16 therefrom. The fuel system 10 also includes suction pumps 22 for delivering fuel 16 to the engines 12 and breakaway valves 24 disposed at or near the junction of each fuel feed line 18 and the respective fuel tank 14 or an upper deck structure 25 of the helicopter. As discussed in the Background of the Invention, the combination of suction pumps 22 and breakaway valves 24 greatly reduces fuel spillage in the event of a fuel line rupture and enhances the safety and crashworthiness of the fuel system 10.

Figure 2:
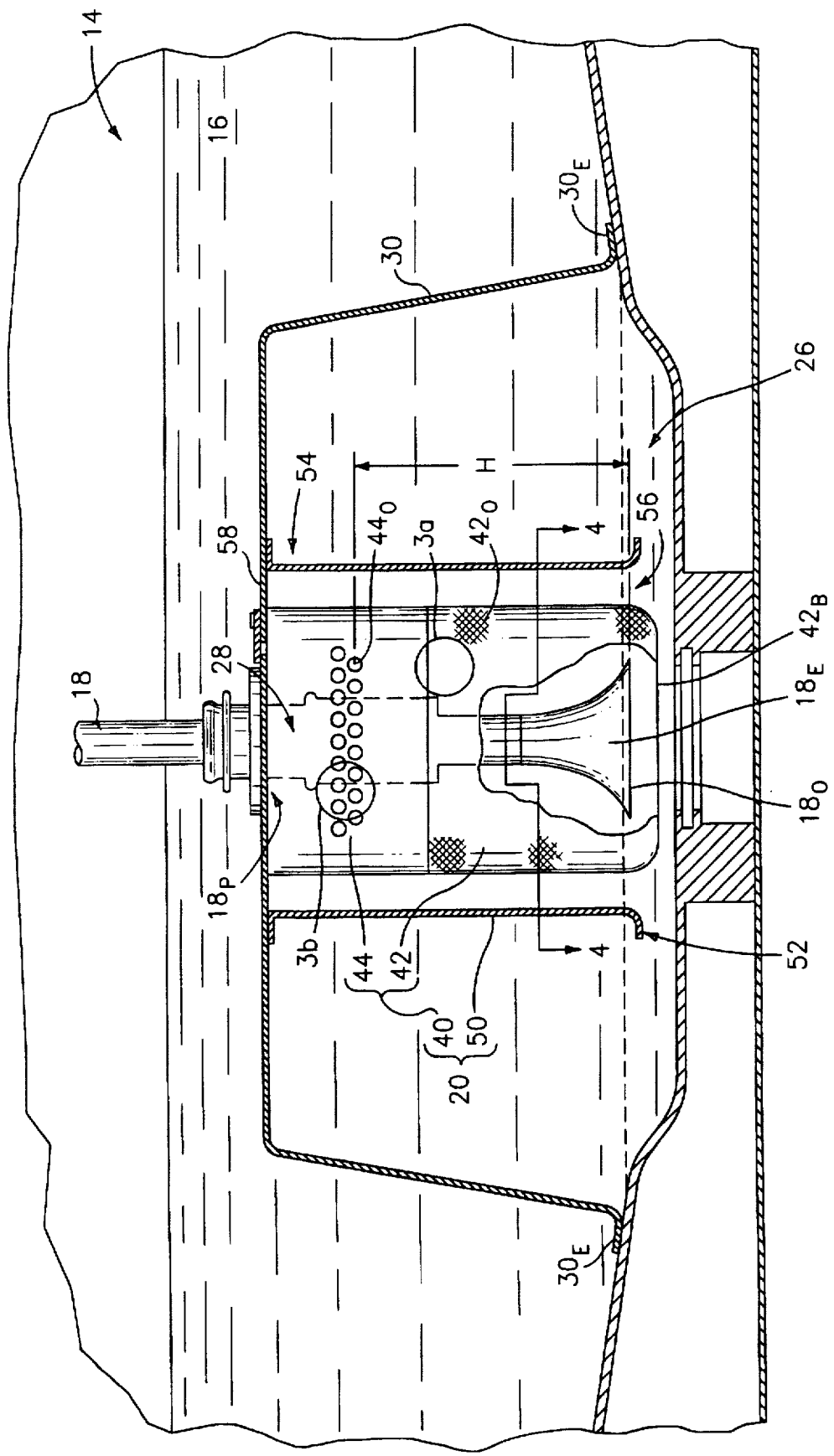
FIG. 2 is a partially broken away and sectioned side view of the fuel intake device disposed within a fuel containing tank, which fuel intake device includes a filter assembly enveloping an end portion of an internal fuel feed line and a shroud member disposed about the filter apparatus.

In FIG. 2, an enlarged view of one of the fuel intake devices 20 is shown wherein the respective fuel feed line 18 is disposed internally of the fuel tank 14 (hereinafter referred to as the "internal fuel feed line") and wherein an end portion $18_E$ of the internal fuel feed line 18 extends into a sump region 26 of the fuel tank 14. The sump region 26 is a low point in the fuel tank 14 where fuel, ice, and debris will gravitate and contains a volume of fuel which is at least about 0.1% of the total volume or fuel carrying capacity of the fuel tank 16. In the described embodiment of the invention, the internal fuel feed line 18 optionally includes an Engine Feed Inlet (EFI) check valve 28 for preventing backflow of fuel 16 into the fuel tank 14 when the engines are shut-down. As such, the EFI check valve 28 ensures that the fuel system remains "primed" or ready for engine start-up.

The internal fuel feed line 18 is supported by means of a bridge structure 30 which mounts at each end $30_E$ thereof to the lower surface of the fuel tank 14. As such, the bridge structure 30 inhibits lateral motion of the internal fuel feed line 18 which may occur due to agitation or "slosh" of the fuel supply 16. In the described embodiment, agitation of the fuel supply 16 occurs in response to helicopter attitude changes, however, it will be appreciated that other fuel system applications will not produce significant fuel movement and, accordingly, may forego the need for such bridge structure 30. That is, the inherent rigidity of the internal fuel feed line 18 may be sufficient to maintain its spatial position within the fuel tank 14.

Figure 4:
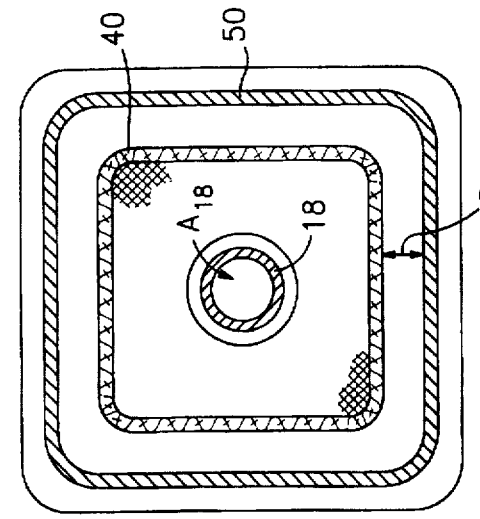
FIG. 4 is a cross-sectional view taken substantially along line 4—4 of FIG. 2.
Figure 3A:
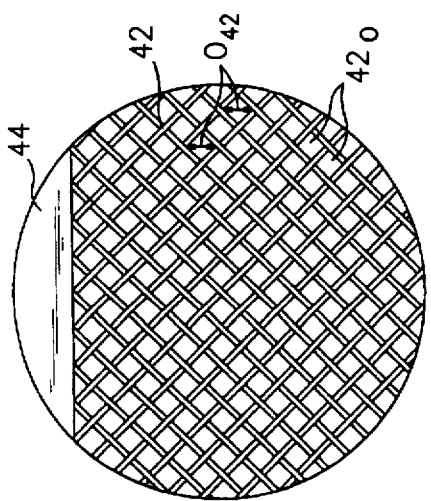
Figure 3B:
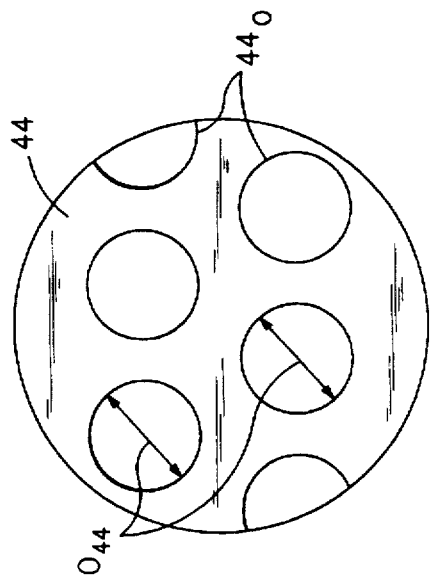

In FIGS. 2 through 4, the fuel intake device 20 comprises a filter assembly 40 enveloping the end portion $18_E$ of the internal fuel feed line 18 and a shroud member 50 disposed about the filter assembly 50. Before discussing the functionality of the filter assembly 40 and the shroud member 50, a brief description of the geometric and structural features of each will be provided.

The filter assembly 40 includes a lower fuel filtering portion 42 defining a plurality of fine apertures $42_O$ and an upper fuel bypass portion 44 defining a plurality of coarse apertures $44_O$. The lower fuel filtering portion 42 is preferably fabricated from an aluminum wire mesh screen wherein each fine aperture $42_O$ thereof defines a maximum opening $O_{42}$ (FIG. 3a) of about 0.050 inches (0.127 cm) to about 0.120 inches (0.310 cm) and wherein the cumulative area of all fine apertures $42_O$ is at least about five times (5×) the flow area $A_{18}$ (see FIG. 4) of the internal fuel feed line 18. The fuel bypass portion 44 is preferably fabricated from a perforated sheet of aluminum wherein each coarse aperture $44_O$ thereof defines a maximum opening $O_{44}$ (FIG. 3b) of about 0.25 inches (0.64 cm) to about 0.375 inches (0.95 cm) and wherein the cumulative area of all coarse apertures $44_O$ is at least about three times (3×) the flow area $A_{18}$ of the internal fuel feed line 18. More preferably, each of the coarse apertures $44_O$ is circular in shape and has a diameter dimension of about 0.25 inches (0.64 cm) to about 0.375 inches (0.95 cm).

The filter assembly 40 is situated about the end portion $18_E$ of the internal fuel feed line 18 such that the inlet orifice $18_O$ thereof is disposed internally of the lower fuel filtering portion 42 and, preferably, is disposed proximal to the base $42_B$ thereof. Furthermore, the coarse apertures $44_O$ of the upper fuel bypass position 44 are distally spaced from the inlet orifice $18_O$. In the described embodiment, the coarse apertures $44_O$ are spaced vertical distance H from the inlet orifice $18_O$, which vertical distance H is at least about 6.0 inches (15.24 cm). The import and significance of the spatial position of the inlet orifice $18_O$ relative to the filter assembly 50 will become apparent in subsequent paragraphs.

The shroud member 50 is disposed about the filter assembly 40 and includes a lower end portion 52 extending into the sump region 26 and an upper end portion 54 disposed in sealed combination with the internal fuel feed line 18. More specifically, the lower end portion 52 of the shroud assembly 50 defines an opening 56 for facilitating fuel flow to the filter assembly 40, and the upper end portion 54 is directly or indirectly sealed to the external periphery $18_P$ of the internal fuel feed line 18. Regarding the latter, sealing of the shroud 50 to the internal fuel feed line 18 may include any sealing arrangement known in the art and will depend upon the geometric configuration of the shroud 50. In the described embodiment, the bridge assembly 30 forms an upper end cap 58 of the shroud member 50 which is sealed to the internal fuel feed line 18. For applications wherein a bridge assembly 30 is not required, the shroud member 50 may be configured such that the upper end thereof directly adjoins the external periphery $18_P$ of the internal fuel feed line 18 and is bonded, welded or otherwise sealed thereto.

As best seen in FIG. 4, the filter assembly 40 is parallelepipedic in shape, though the filter assembly 40 may be cylindrical, ellipsoidal, or spherical in shape. While the shape of the shroud member 50 preferably corresponds to the peripheral shape of the filter assembly 40, it may have any shape which provides a channel or opening for facilitating fuel flow from the sump region 26 to the upper and lower portions 42, 44 of the filter assembly 40.

Before discussing the operation of the fuel intake device 20, it is useful to define two operating modes thereof which includes a normal operating mode and a bypass operating mode. The normal operating mode is one wherein the temperature of the fuel supply 16 is above freezing, hence ice will not form on any components of the fuel intake device 20. The bypass operating mode is one wherein the temperature of the fuel supply 16, i.e., a supply which is water contaminated, is sub-freezing, hence ice may develop and accrete on certain intake device components.

Figure 5:
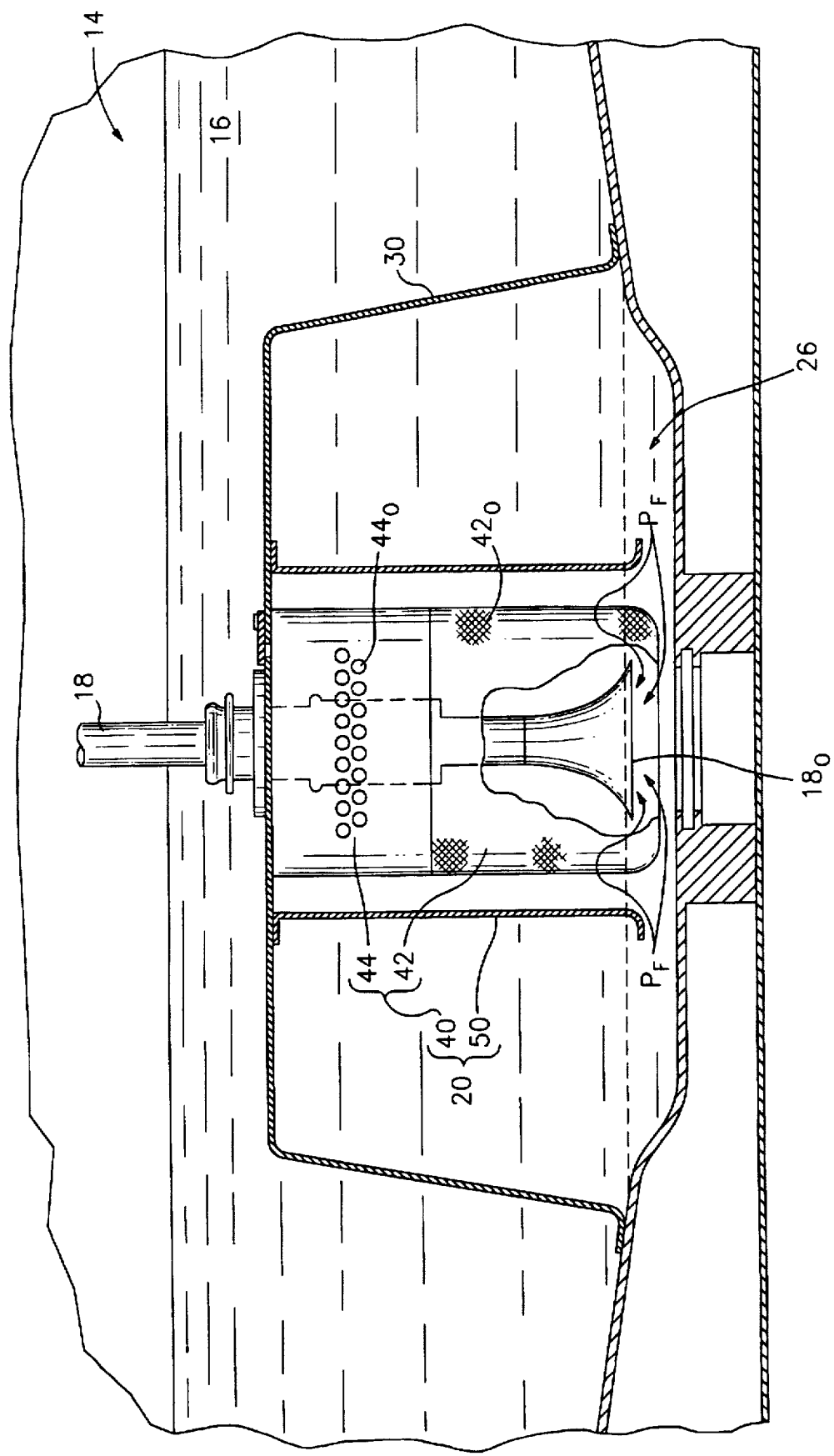
FIG. 5 depicts a normal operating mode of the fuel intake device wherein the fine apertures of the lower fuel filtering portion facilitate a primary flow of fuel therethrough while filtering debris from the fuel supply.

In FIG. 5, fuel intake device 20 is shown in the normal operating mode wherein the fuel system, i.e., the suction pump, effects a localized low pressure at the inlet orifice $18_O$ so as to draw fuel from the sump region 26 of the fuel tank 14. The spatial position of the inlet orifice $18_O$ within the filter assembly 40, in combination with the individual and total flow area of the fine apertures $42_O$ effects a primary flow $P_F$ of fuel 16 through the lower fuel filtering portion 42 while additionally filtering debris from the fuel supply 16. As used herein, a "primary flow of fuel" means that at least 90% of the required fuel flow is provided through the fine apertures $42_O$ of the filter assembly 40. The remaining portion thereof may flow through the coarse apertures $44_O$ of the filter assembly 40. While such flow is filtered to a lesser extent, the velocity thereof is low due to the distal spacing of the coarse apertures $44_O$ relative to the inlet orifice $18_O$. As such, the low velocity flow is incapable of lifting or propelling heavier/dense particles of debris, i.e., debris which is intolerable for engine consumption, from entering the internal fuel feed line 18.

Figure 6:
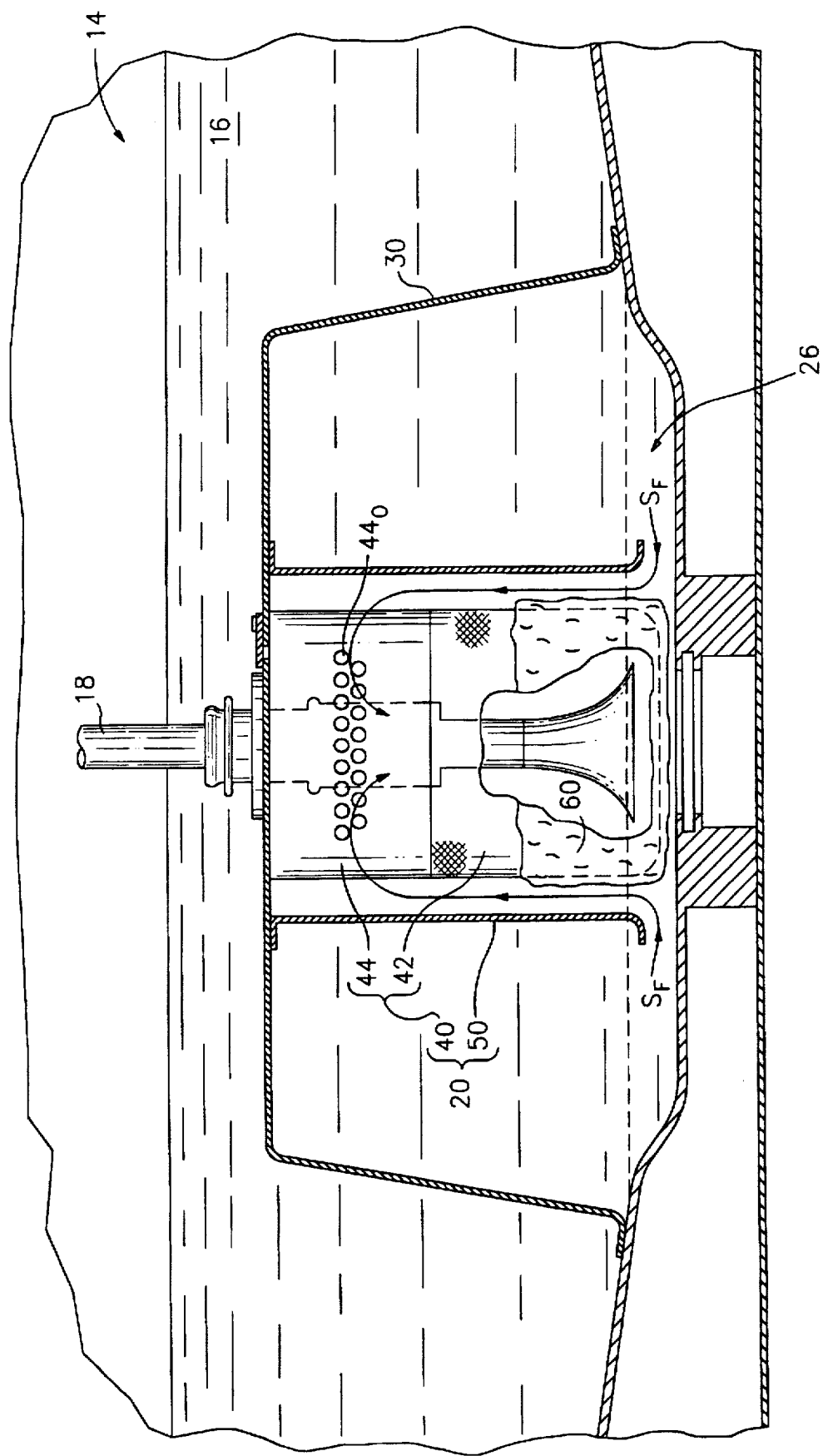
FIG. 6 depicts a bypass operating mode of the fuel intake device wherein the coarse apertures of the upper fuel bypass portion facilitate a secondary flow of fuel therethrough.

In FIG. 6, the fuel intake device 20 is shown in the bypass operating mode wherein an accumulation of ice 60 has formed on the lower fuel filtering portion 42 of the filter assembly 40. In this operating mode, the coarse apertures $44_O$ permit a secondary flow $S_F$ of fuel 16 capable of supplying up to 100% of the required fuel flow. The size of each coarse aperture $44_O$, defined hereinabove, is selected such that ice, which may form about the periphery thereof, will be fragmented by the dynamic pressure of the fuel flow such that sealing of such apertures $44_O$ does not occur. While the principle function of the upper bypass portion 44 of the filter assembly 40 is to provide uninterrupted fuel flow in an icing condition, it is also desirable to select the size of each coarse aperture $44_O$ such that the upper fuel bypass portion 44 functions to strain larger, potentially damaging debris from the fuel supply 16.

Figure 7:
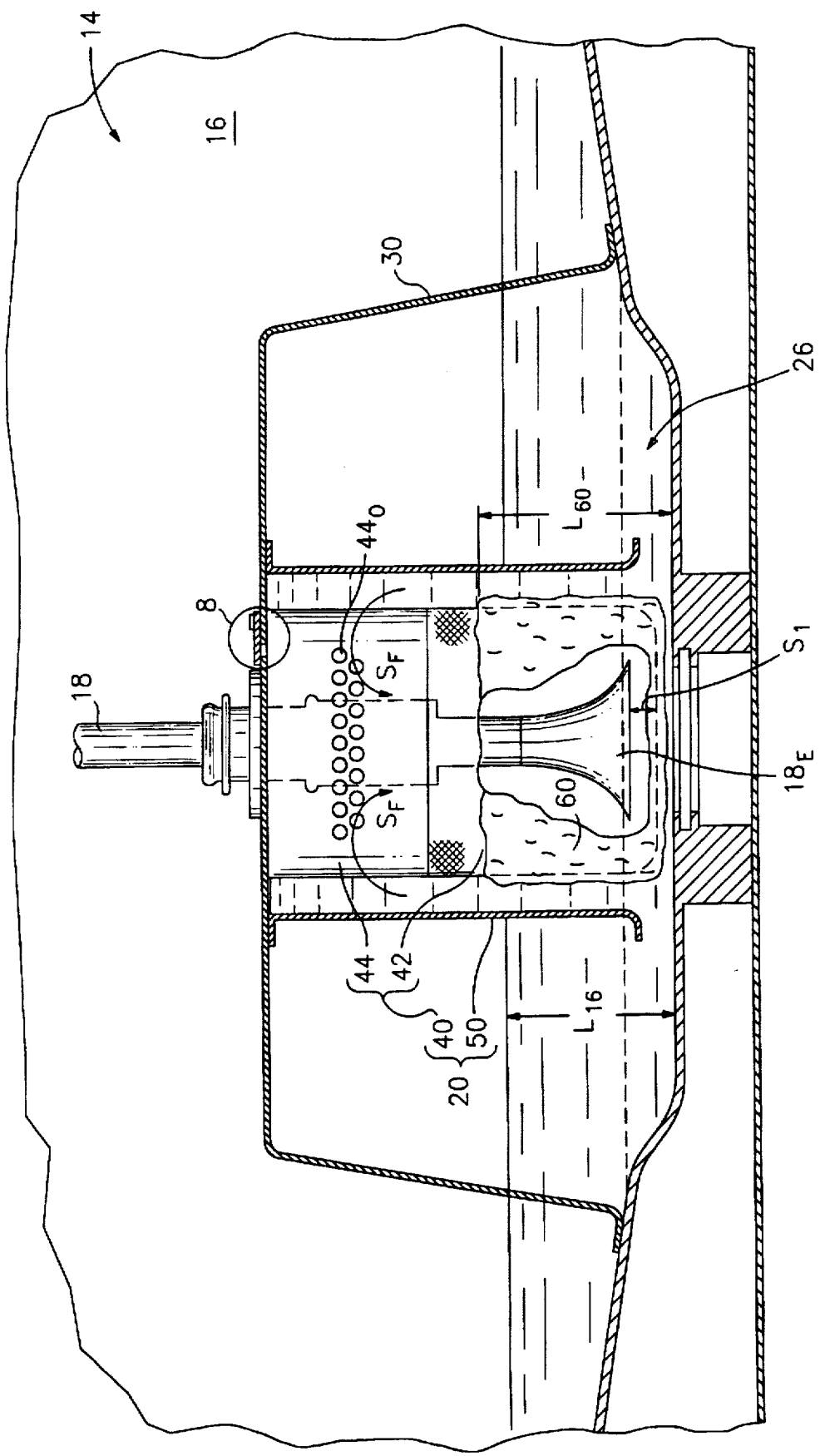
FIG. 7 depicts a bypass operating mode of the fuel intake device wherein the shroud member entrains a flow of fuel from the sump region in response to a condition wherein the fuel level has fallen below a level of ice accretion on the lower fuel filtering portion of the filter assembly.

In FIG. 7, the fuel intake device 20 is shown in the bypass operating mode wherein an accumulation of ice has partially or fully restricted the flow through the fine apertures $42_O$ of the lower fuel filtering portion 42 and wherein the fuel level $L_{16}$ has fallen below the level $L_{60}$ of ice accretion. As such, the shroud member 50, which is disposed in sealed combination with the internal fuel feed line 18, entrains a secondary flow $S_F$ of fuel 16 from the sump region 26 to the upper bypass portion of the 44 of the filter assembly 40. Accordingly, the shroud member 50 may be viewed as an extension of the internal fuel feed line 18, which shroud member 50 draws fuel from the lowest practical level of the fuel tank 14 and maximizes the useable fuel in the fuel tank 14. It will be appreciated that without the shroud member 50, the fuel supply 14 would essentially be cut-off when the fuel level $L_{16}$ falls below the level $L_{60}$ of ice accretion. Accordingly, this volume of fuel would be unavailable for use and, with respect to a helicopter, would reduce the helicopter's range of flight.

Figure 8:
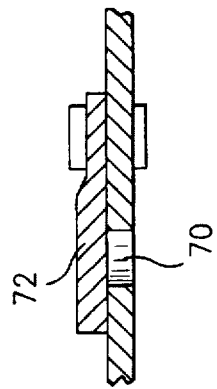
FIG. 8 is an enlarged view of an upper portion of the fuel intake device wherein a vent aperture is provided therein for venting entrapped air or fuel vapor from the shroud member.

While the shroud member 50 maximizes the useable fuel supply, a practical concern relates to the possible entrapment of air or fuel vapor upon refueling. While various methods may be employed to remove such gases, the fuel intake device 20 may include an aperture 70 (see FIG. 8) for venting the upper portion of the shroud member 50 and a flapper check valve 72 disposed over the aperture 70. As such, upon refueling, any entrapped gases may escape through the vent aperture 70 as the fuel level rises in the tank 14. In use, i.e., when the shroud member 50 entrains fuel in the bypass operating mode, the flapper valve 72 seals the aperture 70 so as to enable a negative pressure or vacuum to develop in the shroud member 50.

In addition to providing uninterrupted fuel flow in the bypass operating mode, the preferred fuel intake device 20 is configured so as to minimize pressure drops and avoid accretion of ice within and around the end portion $18_E$ of the internal fuel feed line 18, on the filter assembly 40, and/or between the filter assembly 40 and the shroud member 50. More specifically, the defined cumulative flow areas of the filter assembly 40, i.e., the total area of the fine and coarse apertures $42_O$, $44_O$, are selected to filter debris and/or accept ice accretion while minimizing head loss. Furthermore, the end portion $18_E$ of the internal fuel feed line 18 and the lower fuel filtering portion 42 of the filter assembly 40 define a separation distance $S_1$ therebetween which is preferably greater than about 0.25 inches (0.64 cm) for ensuring unrestricted flow and for preventing ice from bridging the opposed elements. The same rationale applies to the relative spacing of the filter assembly 40 and the shroud member 50 wherein the separation distance $S_2$ therebetween is also preferably greater than about 0.25 inches (0.64 cm).

Moreover, while the end portion $18_E$ of the internal fuel feed line 18 may define a conventional cylindrical shape, the preferred fuel intake device 20 of the present invention defines a bellmouth configuration for gradually accelerating the fuel flow in the internal fuel feed line 18. Such bellmouth configuration effects a low velocity flow though the inlet orifice $18_O$ and through the lower fuel filtering portion 42 of the filter assembly 40, which low velocity flow mitigates ice accretion.

While the fuel intake device 20 of the present invention has been described in the context of a helicopter fuel system 10, it will be appreciated that the fuel intake device may 20 be used in any fuel system wherein filtration is desired, icing conditions are present, and uninterrupted fuel flow is a design requirement. Furthermore, while the fuel intake device 20 is described in combination with a suction fuel system, it will be appreciated that the teachings herein may also be employed in pressure fuel systems.

In summary, the fuel intake device 20 of the present invention filters debris from the fuel supply during normal operating conditions and provides uninterrupted fuel flow in icing conditions. Accordingly, the fuel intake device 20 obviates the requirements for anti-icing additives and the inherent disadvantages thereof. The size, shape and spatial relationships between the various elements of the fuel intake device minimize pressure drops and obviate ice accretion. As such, the fuel intake device 20 is especially well-suited for a suction fuel system, which as discussed in the Background of the Invention, is highly sensitive to pressure drops. Furthermore, the fuel intake device 20 requires no moving parts and, therefore, is highly reliable. Finally, the use of a shroud member 50 disposed about the filter assembly 40 maximizes the useable fuel supply in the fuel tank.

What is claimed is:

1. A fuel intake device (20) for use in combination with a fuel system (10), the fuel system (10) having a fuel tank (14) for containing a supply of fuel (16), the fuel tank (14) defining a sump region (26), the fuel intake device (20) comprising:

an internal fuel feed line (18) having an end portion ($18_E$) adapted to extend into the sump region (26) and defining an inlet orifice ($18_O$) for drawing fuel (16) from said sump region;

a filter assembly (40) enveloping the end portion ($18_E$) of the internal fuel feed line (18) and having a lower fuel filtering portion (42) and an upper fuel bypass portion (44), said lower fuel filtering portion (42) having a plurality of fine apertures ($42_O$) therein for facilitating a primary fuel flow $P_F$ of fuel (16) therethrough and for filtering debris from the supply of fuel (16) in a normal operating mode, said upper fuel bypass portion (44) having a plurality of coarse apertures ($44_O$) for facilitating a secondary flow $S_F$ of fuel (16) therethrough in a bypass operating mode;

each of said fine apertures ($42_O$) defining a maximum opening size ($O_{42}$) of about 0.050 inches (0.127 cm) to about 0.12 inches (0.310 cm) and each of said coarse apertures ($44_O$) defining a maximum opening size ($O_{44}$) of about 0.25 inches (0.64 cm) to about 0.375 inches (0.95 cm);

said filter being situtated about the end portion ($18_E$) such that the inlet orifice ($18_O$) thereof is disposed internally of the lower fuel filtering portion (42) and such that said coarse apertures ($44_O$) of said upper fuel bypass portion (44) are distally spaced from the inlet orifice ($18_O$); and a shroud member (50) disposed about said filter assembly (40) and having upper and lower end portions (52, 54), said upper end portion (52) being disposed in sealed combination with an external peripheral surface ($18_P$) of the internal fuel feed line (18), said lower end portion (54) extending into the sump region (26) and defining an opening (56) for facilitating fuel flow to said filter assembly (40).

2. The fuel intake device (20) according to claim 1 wherein the internal fuel feed line (18) defines a flow area ($A_{18}$), wherein said fine apertures ($42_O$) define a cumulative flow area, and wherein said coarse apertures ($44_O$) define a cumulative flow area, said cumulative flow of said fine apertures ($42_O$) being at least about five times the flow area ($A_{18}$) of the internal fuel feed line (18), said cumulative flow area of said coarse apertures ($44_O$) being at least about three times the flow area ($A_{18}$) of the internal fuel feed line (18).

3. The fuel intake device (20) according to claim 1 wherein said lower fuel filtering portion (42) is fabricated from an aluminum wire mesh screen.

4. The fuel intake device (20) according to claim 1 wherein said upper fuel bypass portion (44) is fabricated from a perforated sheet of aluminum.

5. The fuel intake device (20) according to claim 1 wherein the inlet orifice ($18_O$) of the internal fuel feed line (18) is proximal to a base ($42_B$) of the lower fuel filtering portion (42) and wherein said coarse apertures ($44_O$) of said upper fuel bypass portion (44) are disposed a vertical distance H from said inlet orifice ($18_O$), said vertical distance H being at least about 6 inches (15.24 cm).

6. The fuel intake device (20) according to claim 1 wherein said filter assembly (40) and said shroud member (50) define a separation distance ($S_2$) therebetween, said separation distance ($S_2$) being at least about 0.25 inches (0.64 cm).

7. The fuel intake device (20) according to claim 1 wherein the end portion ($18_E$) of the internal fuel feed line (18) and the lower fuel filtering portion (42) define a separation distance ($S_1$) therebetween, said separation distance ($S_1$) being at least 0.25 inches (0.64 cm).

8. The fuel intake device (20) according to claim 1 wherein the end portion ($18_E$) of the internal fuel feed line (18) has a bellmouth configuration.

* * * * *